Dec. 12, 1967        A. J. KROL        3,357,105

DEVICE FOR USE IN PROSTHETIC DENTISTRY

Filed Feb. 10, 1965        2 Sheets-Sheet 1

INVENTOR.
Arthur J. Krol

BY Howard W. Hermann

ATTORNEY

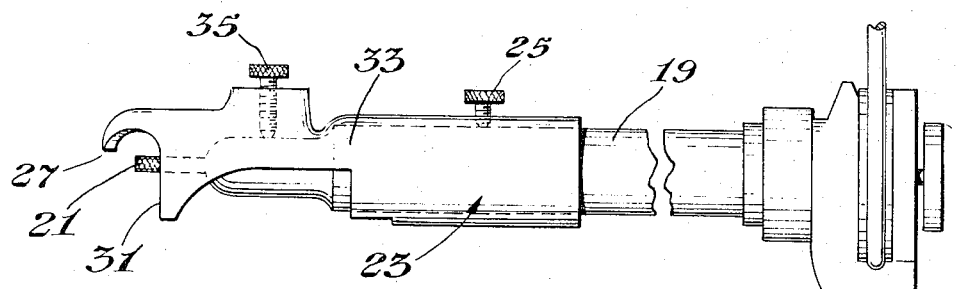
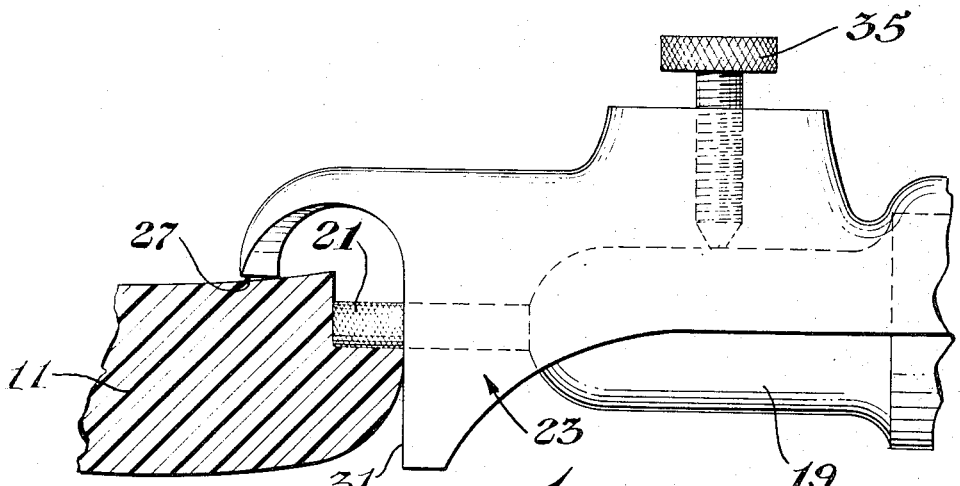
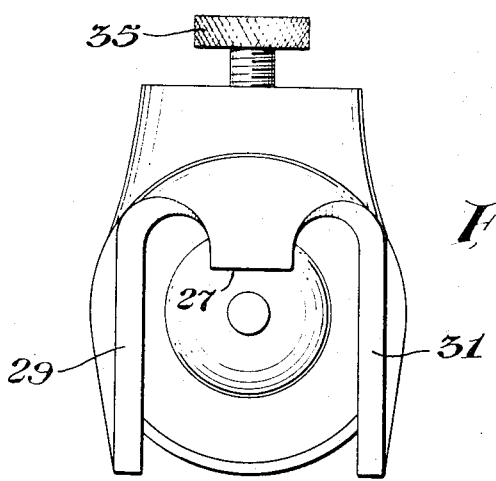

United States Patent Office 3,357,105
Patented Dec. 12, 1967

---

3,357,105
DEVICE FOR USE IN PROSTHETIC DENTISTRY
Arthur J. Krol, San Francisco, Calif., assignor to Dow Corning Corporation, Midland, Mich., a corporation of Michigan
Filed Feb. 10, 1965, Ser. No. 431,587
4 Claims. (Cl. 32—40)

ABSTRACT OF THE DISCLOSURE

A guiding device adapted for use with a dental handpiece, the device comprising a clamping portion for affixing the guiding device to the handpiece, a guiding portion including guiding surfaces at substantially right angles to one another, a necked portion between the guiding and clamping portions and an adjustment screw for selectively springing the neck portion to pivot the guiding surfaces with respect to the clamping portion.

---

The present invention relates to tools for use in prosthetic dentistry and more particularly, to special purpose prosthetic dentistry tools.

In copending U.S. patent application, Ser. No. 431,610, filed concurrently herewith, there is described a system for retaining dentures in the mouth of the wearer by use of a hydraulic seal. A fluid-filled tube of silicone rubber, or the like, is mounted in a notch or groove cut in the periphery of the denture. The seal prevents air from entering the area between the denture and the mouth. As pointed out in that application, the groove size is important if an effective seal is to be maintained.

It is the primary object of the present invention to provide an instrument for assuring correct dimensions of the groove cut in the denture for the hydraulic seal.

In accordance with this and other objects there is provided by the present invention a guide tool selectively positionable on a dental handpiece for use in guiding the cutting member of the handpiece to provide a groove of proper dimensions for use in installing the hydraulic retention means described in the aforementioned patent application. Adjustment is provided so that the groove size may be varied for different tubing sizes and grinding burr sizes.

Other objects and many attendant advantages will become apparent to those skilled in the art by a consideration of the following detailed description of the invention when read in conjunction with the accompanying drawing wherein:

FIG. 4 is a side view of a portion of a dental handpiece having attached thereto an embodiment of the tool of the present invention;

FIG. 5 is an end view of the tool shown in FIG. 4; and

FIG. 6 is a partial side view showing the tool in cutting relationship with a denture and illustrating the use of the tool.

Figure 1:
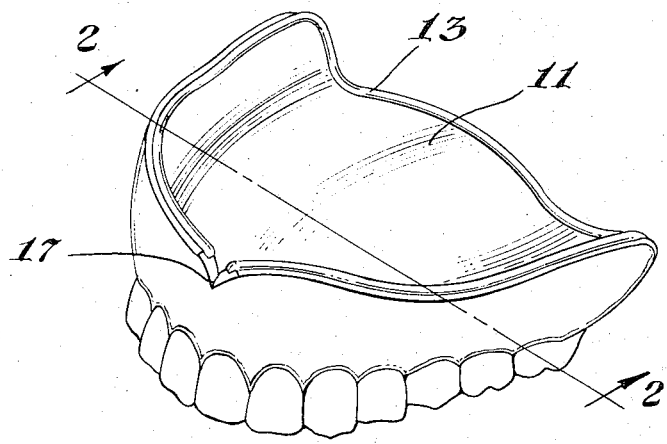
FIG. 1 is a view in perspective of a maxillary denture incorporating the sealing means described in the aforementioned application.
Figure 2:
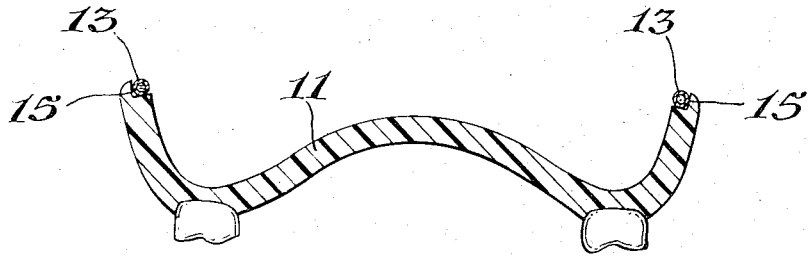
FIG. 2 is a cross-sectional view of the denture of FIG. 1 taken along the line 2—2 of FIG. 1.
Figure 3:
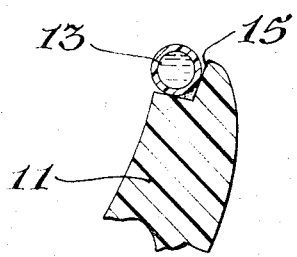
FIG. 3 is an enlarged cross-sectional view showing a portion of FIG. 2 in greater detail to illustrate the hydraulic sealing tube mounted in the notch or groove cut for it.

Referring now to the drawings wherein like reference characters designate like or corresponding parts throughout the figures thereof, there is shown in FIG. 1 a maxillary denture 11 having positioned around its periphery a fluid-filled tube 13. As may be seen more easily from FIGS. 2 and 3, a right-angular groove or notch 15 is provided around the denture periphery for the tube 13. At either side of the labial notch 17, the ends of the tube 13 are buried in the denture. No sealing means are normally necessary at this point since the lips overhang the denture and form an effective seal. The lack of auxiliary sealing means in the area of the labial notch permits removal of the denture without damage to the sealing retainer by simply reaching under the lip and grasping the denture at or near the labial notch.

As is pointed out in the aforementioned copending application the size of the groove is quite critical. In FIGS. 4 and 5, there is shown a tool which may be utilized to cut a groove of the proper size simply and efficiently. A conventional dental handpiece 19 having a burr 21 mounted therein has the guiding instrument 23 affixed thereto by means of a thumbscrew 25, or the like, at a clamping portion thereof. The inside diameter of the instrument 23 in the clamping portion is slightly less than the outer diameter of the barrel portion of the handpiece 19 over which it is adapted to slide. The relative sizes, however, of the handpiece barrel and attachment portion of the guide must be sufficiently close to form a rigid attachment between the two when the thumbscrew is tightened.

The end portion of the guide 23 which is opposite the attachment portion, i.e. the area surrounding thumbscrew 25, is formed with three guiding surfaces 27, 29 and 31 which are adapted to rest against the surfaces of the denture 11 as shown in FIG. 6 during the groove cutting operation. The size of the cut is adjustable. To regulate the depth of cut in the direction axial with the burr 21, the thumbscrew 25 is utilized to slide the guide along the barrel of the handpiece 19 and affix it in its proper position.

A necked portion 33 allows resilient movement of the guide surface portions by use of a second thumbscrew 35, which also bears on the handpiece and causes pivotal motion of the guide surfaces about the necked portion 33. This thumbscrew is adjusted to regulate the depth of cut in a direction perpendicular to guide surface 27 and perpendicular to the axis of the handpiece 19. By proper adjustment of the thumbscrews 25 and 35, the size of the groove cut by the burr 21 may be closely controlled as long as the denture peripheral area rests against the guide surfaces 27, 29 and 31 as shown in FIG. 6.

Obviously, modifications and variations of the above described embodiment of the invention will become obvious to those skilled in the art. It is to be understood therefore that the invention may be practiced otherwise than as specifically described.

That which is claimed is:

1. A guiding device for use with a rotary cutting tool having a cylindrical cutting portion and a cylindrical holding portion, said device comprising:
   a clamping portion having means thereon for adjustably affixing said guiding device to said holding portion of the cutting tool,
   a guiding portion comprising guiding surfaces at substantially right angles to one another, said guiding portion being attached to said clamping portion and spaced therefrom in a direction substantially axially to said cutting portion of said cutting tool when said clamping portion is affixed thereto, and
   means for adjusting said guiding surfaces with respect to said cutting portion of said cutting tool, said means including:
   a necked attachment between said guiding portion and said clamping portion, and
   an adjustment screw for selectively springing said necked portion to pivot said guiding surfaces with respect to said clamping portion.

2. A guiding device as defined in claim 1 wherein said means on said clamping portion for affixing said guiding device includes means for affixing the device to a dental handpiece.

3. A guiding device for use with a rotary cutting tool having a cylindrical cutting portion and a cylindrical holding portion, said device comprising:

a clamping portion having means thereon for adjustably affixing said guiding device to said holding portion of the cutting tool, and a guiding portion comprising guiding surfaces positioned at angles with respect to one another, said guiding portion being attached to said clamping portion and spaced therefrom in a direction substantially axially to said cutting portion of said cutting tool when said clamping portion is affixed thereto, said guiding device further including means for adjusting said guiding surfaces with respect to the cutting portion of the cutting tool, said means including a necked attachment between the guiding portion and the clamping portion, and an adjustment screw for selectively springing said necked portion to pivot said guiding surfaces with respect to said clamping portion.

4. A guiding device as defined in claim 3 wherein said guiding device is adapted for use with a dental handpiece.

References Cited

UNITED STATES PATENTS

| 383,367 | 5/1888 | Patrick | 32—29 |
| 1,480,730 | 1/1924 | Lentz | 32—29 |

LOUIS G. MANCENE, *Primary Examiner.*

C. WENTZEL, *Assistant Examiner.*